United States Patent [19]

Imamura et al.

[11] 3,860,603

[45] Jan. 14, 1975

[54] PROCESS FOR PREPARING 3-HYDROXY-ISOXAZOLE DERIVATIVE

[75] Inventors: Kennosuke Imamura; Toshio Kikuchi, both of Tokyo; Shunichi Kanazawa, Chiba, all of Japan

[73] Assignee: Nippon Chemical Industrial Co., Ltd., Tokyo, Japan

[22] Filed: Oct. 24, 1972

[21] Appl. No.: 300,089

[30] Foreign Application Priority Data

Oct. 23, 1971 Japan.............................. 46-83679

[52] U.S. Cl....... 260/307 H, 260/521 R, 260/521 A, 260/535 R, 260/559 R, 260/561 N
[51] Int. Cl............................................. C07d 85/22
[58] Field of Search..................... 260/307 H, 307 A

[56] References Cited
UNITED STATES PATENTS
3,687,968   8/1972   Iwai et al. ...................... 260/307 H

*Primary Examiner*—Raymond V. Rush
*Attorney, Agent, or Firm*—Sughrue, Rothwell, Mion, Zinn & Macpeak

[57] ABSTRACT

A process for preparing 3-hydroxy-isoxazole compounds of the formula:

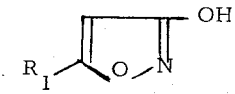

wherein $R_1$ represents a member selected from the group consisting of an hydrogen atom, an alkyl group, an aryl group, and an aryl group substituted with a member selected from the group consisting of a halogen atom, a nitro group and a lower alkyl group, which comprises reacting in the presence of a suitable solvent and at a temperature of from −20°C to 70°C, a compound of the formula:

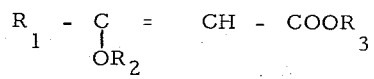

wherein $R_1$ is defined as above, and $R_2$ and $R_3$ represent lower alkyl groups, with hydroxylamine in the presence of an alkali, subsequently treating the reaction product with acid, and then separating the acidified reaction product from the reaction system is disclosed.

3 Claims, No Drawings

PROCESS FOR PREPARING 3-HYDROXY-ISOXAZOLE DERIVATIVE

BACKGROUND OF THE INVENTION

1. Field of the Invention

The present invention relates to a process for preparing certain 3-hydroxy-isoxazole derivatives represented by the general formula:

wherein $R_1$ represents a hydrogen atom, an alkyl group, an aryl group, or an aryl group substituted by a halogen atom, a nitro group or a lower alkyl group.

2. Description of the Prior Art

As a process for producing 3-hydroxy-isoxazole derivatives on an industrial scale, there have hitherto been known the process of, for example, reacting a propiolic acid alkyl ester with hydroxylamine in the presence of an alkali metal hydroxide (Japanese Patent Publication No. 25660/67); the process of reacting an alpha, beta-halogen substituted carboxylic acid ester derivative, with hydroxylamine in the presence of an alkali metal hydroxide, etc. (Japanese Patent Publication No. 14704/68), and similar processes.

However, all of the above-described processes are accompanied by considerable difficulties when practiced on an industrial scale. For example, in the former process, the starting material, the propiolic acid alkyl ester derivative, is hardly available industrially.

SUMMARY OF THE INVENTION

As the result of studies in the light of these defects, applicants have discovered that these 3-hydroxy-isoxazole derivatives can easily be produced by the reaction between a beta-alkoxyacrylate derivative and hydroxylamine.

That is, the present invention relates to a process for preparing 3-hydroxy-isoxazole derivatives represented by the above general formula (I), which comprises reacting a beta-alkoxyacrylate derivative represented by the general formula:

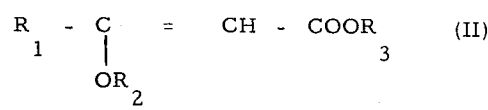

wherein $R_1$ represents a hydrogen atom, an alkyl group, an aryl group, an aryl group substituted by a halogen atom, a nitro group or a lower alkyl group, and $R_2$ and $R_3$ represent the same or different lower alkyl groups, with hydroxylamine in the presence of an alkali, and subsequently treating the reaction product with an acid. In the above general formula (II), where $R_1$, $R_2$ and $R_3$ represent alkyl groups, they preferably contain 1-4 carbon atoms.

DETAILED DESCRIPTION OF THE INVENTION

The process in accordance with the present invention is illustrated by the following reaction schematic diagram:

$$R_1-C(OR_2)=CH-COOR_3 + NH_2OH \xrightarrow{OH^-} R_1-C(OR_2)=CH-\overset{O}{\overset{\|}{C}}NHOH + R_3OH \quad \ldots (1)$$

$$R_1-C(OR_2)=CH-\overset{O}{\overset{\|}{C}}NHOH \xrightarrow{H^+} \underset{R_1}{\overset{OH}{\text{isoxazole}}} + R_2OH \quad \ldots (2)$$

Therefore, in the latter process, alpha, beta-halogen substituted carboxylic acid ester derivatives are used as the starting material which substantially produces said material. However, a large amount of alkali is required in the reaction with the hydroxylamine. That is, since hydroxylamine is usually used in the form of hydrochloride or sulfate, the amount of alkali directly necessary for the present reaction and the amount of dehydrohalogenating agent required is great. Therefore the latter process requires the alkali in an amount of at least 2 times that in the former process. Thus, there will be formed a large amount of salt as a by-product, resulting in the loss of the end product upon separation due to the adsorption or adhesion of the product to the salt.

Besides, these reactions require a comparatively long reaction time, and thus, they have considerable problems from an industrial standpoint.

In the above formulae, $R_1$, $R_2$ and $R_3$ are the same as defined above.

As the typical starting material to be used in this invention and represented by the above general formula (II), there are illustrated, for example, those as follows: methyl beta-methoxyacrylate; ethyl beta-methoxyacrylate; methyl beta-ethoxyacrylate; ethyl beta-ethoxyacrylate; methyl beta-methyl, beta-methoxyacrylate; ethyl beta-methyl, beta-methoxyacrylate; propyl beta-methyl, beta-methoxyacrylate; butyl beta-methyl, beta-methoxyacrylate; methyl beta-methyl, beta-ethoxyacrylate; ethyl beta-methyl, beta-ethoxyacrylate; methyl beta-methyl, beta-propoxyacrylate; ethyl beta-methyl, beta-propoxyacrylate; methyl beta-ethyl, beta-methoxyacrylate; ethyl beta-ethyl, beta-methoxyacrylate; methyl beta-ethyl, beta-ethoxyacrylate; ethyl beta-ethyl, beta-propoxyacrylate;

ethyl beta-propyl, beta-methoxyacrylate; ethyl beta-butyl, beta-methoxyacrylate; ethyl beta-phenyl, beta-methoxyacrylate; ethyl beta-phenyl, beta-ethoxyacrylate; ethyl beta-(4-chlorophenyl), beta-methoxyacrylate; ethyl beta-(4-bromophenyl), beta-ethoxyacrylate; ethyl beta-(4-nitrophenyl), beta-methoxyacrylate; ethyl beta-(4-methylphenyl), beta-ethoxyacrylate; etc.

On the other hand, the other starting material, hydroxylamine, may be used in the usually available form of a salt neutralized with hydrochloric acid, sulfuric acid, and other suitable neutralizing acids.

As described above, the reaction of this invention is a dealcoholization reaction, and hence, in practice, it is particularly preferable to use water, a lower alcohol, such as methanol, ethanol and propanol, or a mixture thereof as the solvent. However, other solvents may also be used provided they are inert in the reaction of this invention. Therefore, the solvents to be used are not particularly limited to those described above.

In carrying out the reaction of the present invention, the reaction temperature may be in the range of from −20°C to 70°C, but normally a temperature of from the ordinary room temperature to about 60°C is practical and preferred.

In general, the reaction temperature in the second step of the ring closure by acid treatment is preferably a little higher than that in the first step of producing the hydroxamic acid derivative according to the reaction of the above formula (1). In the reaction, special heating is not necessary, and the reaction can be conducted by adjusting the reaction temperature. In many cases, if the reaction temperature is lower than room temperature, the reaction rate becomes slow, while, if the temperature is raised to the temperature higher than is necessary, the end product becomes subject to decomposition.

Since the reaction rate of the reaction of the present invention is faster than that of the conventional reactions, the reaction time necessary for the completion thereof is shorter than that in the conventional processes. A reaction time of from 0.5–6 hours is therefore satisfactory. As the alkali to be used in the first step of the reaction of this invention, hydroxides of alkali metals, such as sodium hydroxide, potassium hydroxide, etc., alkali metal alcoholates, ammonia, and the like are practical. On the other hand, as the acid to be used in the second step, mineral acids, such as hydrochloric acid and sulfuric acid, or organic acids such as formic acid, acetic acid, etc., are suitable, which may be used in combination.

The first step of the invention is conducted using substantially a stoichiometric amount of reactants but in many cases, hydroxylamine is used in an equivalent or a little excessive amount per mole of the compound of the foregoing formula (II). The alkali to be present is used in an amount of 1 mole or a slightly excessive amount per 1 mole of hydroxylamine. In this case, the presence of a particularly excessive amount of alkali does not substantially affect the reaction of the invention. However, considering the separation of the salt to be formed, to use a substantially excessive amount of alkali is preferably avoided.

In the present invention, the first and the second steps are conducted continuously, but in some cases, the by-product salt may be separated in the course thereof.

Thus, after the completion of the reaction, the end product can be obtained by the usual operation of separation and purification. For example, the by-product salt is separated by filtration, the solvent is distilled off, and the end product is extracted with ether and, if necessary, recrystallized. Thus, there can be obtained the end product.

As described above, in the process in accordance with the invention, a beta-alkoxyacrylate is used as a starting material, which is comparatively easily available industrially, the reaction time is shortened, and the alkali is used in a smaller amount as compared with conventional processes used to date to prepare the desired compounds. Therefore, the process of the present invention is advantageous from an industrial standpoint. Furthermore, since the reaction of the invention is a dealcoholization reaction, the alcohol by-product itself can advantageously be the reaction solvent, which is considered to be of merit in operation.

Now, the present invention will be described in greater detail below by reference to the Examples, which follow but by no means are these Examples deemed limitive of the same.

EXAMPLE 1

100 ml of a methanol solution in which 0.11 mole of hydroxylamine hydrochloride had been dissolved was placed in a reaction vessel, and a methanol solution containing 0.22 mole of potassium hydroxide was then added dropwise thereto at room temperature under stirring. After stirring for a while, 0.1 mole of methyl beta-methyl, beta-methoxyacrylate was added dropwise thereto, and the stirring was continued for 3–4 hours at room temperature. Subsequently, the pH of the reaction system was adjusted to 1 by blowing hydrochloric acid gas therethrough and the system was maintained at that state for a while. After completion of the reaction, the reaction solution was filtrated to separate the by-product salt, potassium chloride, and the filtrate was distilled to remove methanol. Subsequently, the residue was extracted with 50cc of toluene. Upon distilling off the solvent, there was obtained 6.5 g of yellow, crystalline 3-hydroxy-5-methylisoxazole (in 65.7% yield).

| Elemental analysis: (%) | C | H | N |
|---|---|---|---|
| Calculated: | 48.48 | 5.09 | 14.14 |
| Found: | 48.31 | 5.10 | 14.21 |

EXAMPLE 2

0.11 mole of hydroxylamine hydrochloride and 0.22 mole of potassium hydroxide were reacted with each other in ethanol and, after stirring for a while, 0.1 mole of ethyl beta-phenyl, beta-methoxyacrylate was added dropwise thereto at room temperature. After stirring for a further 3–4 hours, hydrochloric acid gas was blown therethrough to adjust the pH to 1. Then, separation and extraction were conducted in the same manner as in Example 1 to thereby obtain 4.6 g of white, columnar crystals of 3-hydroxy-5-phenylisoxazole (in 41.4% yield).

| Elemental analysis (%) | C | H | N |
| --- | --- | --- | --- |
| Calculated: | 67.67 | 4.38 | 8.69 |
| Found: | 67.12 | 4.29 | 8.73 |

EXAMPLES 3–8

Various 3-hydroxyisoxazole derivatives were synthesized by the same procedure as in Example 1. The reaction conditions and the results thereof are given in the following Table.

Table I

| Example No. | Starting material | mole | Hydroxyl-amine | mole | Alkali | (mole) | Acid | (pH) | Temp.°C | Time (hr) | End product | Yield % |
| --- | --- | --- | --- | --- | --- | --- | --- | --- | --- | --- | --- | --- |
| 3 | a | 0.1 | HCl salt | 0.11 | KOH | 0.20 | HCl gas | 1.0 | 20–50 | 2 – 4 | A | 36.5 |
| 4 | b | 0.1 | do. | 0.11 | do. | 0.13 | do. | 1.5 | 30–40 | 2 – 4 | B | 68.4 |
| 5 | c | 0.1 | H$_2$SO$_4$ salt | 0.12 | do. | 0.22 | H$_2$SO$_4$ | 1.0 | 20–40 | 2 – 4 | C | 62.5 |
| 6 | d | 0.1 | HCl salt | 0.12 | NH$_3$ | 0.23 | HCl gas | 1.0 | 20–50 | 2 – 4 | D | 52.8 |
| 7 | e | 0.1 | H$_2$SO$_4$ salt | 0.11 | CH$_3$ONa | 0.21 | H$_2$SO$_4$ | 1.0 | 20–50 | 2 – 5 | E | 46.3 |
| 8 | f | 0.1 | HCl salt | 0.12 | KOH | 0.25 | HCl gas | 1.0 | 20–50 | 2 – 5 | F | 32.5 |

(Starting material)
a: Ethyl beta-methoxyacrylate
b: Butyl beta-methyl, beta-methoxyacrylate
C: Ethyl beta-ethyl, beta-propoxyacrylate
d: Methyl beta-phenyl, beta-ethoxyacrylate
e: Ethyl beta-(4-chlorophenyl), beta-methoxyacrylate
f: Ethyl beta-(4-methylphenyl), beta-methoxyacrylate
End product
A: 3-Hydroxy-isoxazole
B: 3-Hydroxy-5-methyl-isoxazole
C: 3-Hydroxy-5-ethyl-isoxazole
D: 3-Hydroxy-5-phenyl-isoxazole
E: 3-Hydroxy-5-(m-chlorophenyl)-isoxazole
F: 3-Hydroxy-5-(4-methylphenyl)-isoxazole

EXAMPLE 9

100 ml of propanol containing 0.11 mole of hydroxylamine hydrochloride was placed in a reaction vessel, and a propanol solution containing 0.20 mole of potassium hydroxide was then added dropwise thereto at 30°C under stirring. After stirring for a while, 0.1 mole of methyl beta-methyl, beta-propoxyacrylate was added dropwise thereto, and stirring was continued for 3–4 hours at 20°–40°C. Subsequently, hydrochloric acid gas was blown into the reaction system to adjust the pH thereof to 1, and the reaction system was maintained in that state for a while under stirring. After completion of the reaction, the reaction solution was filtrated to separate out the potassium chloride, and the end product was separated and purified in a conventional manner to thereby obtain 6.91 g of yellow, crystalline 3-hydroxy-5-methyl-isoxazole (in 69.8% yield).

| Elemental analysis (%) | C | H | N |
| --- | --- | --- | --- |
| Calculated: | 48.48 | 5.09 | 14.14 |
| Found: | 48.45 | 5.05 | 14.16 |

The compounds prepared by this process are used as intermediate raw materials in the preparation of agricultural and medicinal compounds.

Although the present invention has been adequately described in the foregoing specification and examples included therein, it is readily apparent that various changes and modifications can be made without departing from the spirit and scope thereof.

What is claimed is:

1. A process for preparing 3-hydroxyisoxazole compounds of the formula:

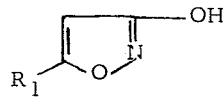

wherein $R_1$ represents a member selected from the group consisting of a hydrogen atom, $C_1$–$C_4$ alkyl, phenyl and phenyl substituted with a member selected from the group consisting of a halogen atom, nitro and $C_1$–$C_4$ alkyl, which comprises reacting in the presence of a solvent selected from the group consisting of H$_2$O, CH$_3$OH, C$_2$H$_5$OH, C$_3$H$_7$OH and mixtures thereof and at a temperature of from −20°C to 70°C, a compound of the formula:

$$R_1 - \underset{\underset{OR_2}{|}}{C} = CH - COOR_3$$

wherein $R_1$ is defined as above, and $R_2$ and $R_3$ represent the same or different $C_1$–$C_4$ alkyl groups, with hydroxylamine in the presence of an alkali selected from the group consisting of an alkali metal hydroxide, ammonium hydroxide and an alkali metal salt of methane, subsequently treating the reaction product with an acid selected from the group consisting of HCl, H$_2$SO$_4$, or a mixture thereof, and then separating the acidified reaction product from the reaction system.

2. The process of claim 1, wherein said temperature ranges from room temperature to 60°C.

3. The process of claim 1, wherein said beta-alkoxyacrylate compound is a member selected from the group consisting of methyl beta-methoxyacrylate, ethyl beta-methoxyacrylate, methyl beta-ethoxyacrylate, ethyl beta-ethoxyacrylate, methyl beta-methyl-beta-methoxyacrylate, ethyl beta-methyl-beta-methoxyacrylate, propyl beta-methyl-beta-methoxyacrylate, butyl beta-methyl-beta-methoxyacrylate, methyl beta-methyl-beta-ethoxyacrylate, ethyl beta-methyl-beta-ethoxyacrylate, methyl beta-methyl-beta-propoxyacrylate, ethyl beta-methyl-beta-propoxyacrylate, methyl beta-ethyl-beta-methoxyacrylate, ethyl beta-ethyl-beta-methoxyacrylate, methyl beta-ethyl-beta-ethoxyacrylate, ethyl beta-ethyl-beta-propoxyacrylate, ethyl beta-propyl-beta-methoxyacrylate, ethyl beta-butyl-beta-methoxyacrylate, ethyl beta-phenyl-beta-methoxyacrylate, ethyl beta-phenyl-beta-ethoxyacrylate, ethyl beta-(4-chlorophenyl)-beta-methoxyacrylate, ethyl beta-(4-bromophenyl)-beta-ethoxyacrylate, ethyl beta-(4-nitrophenyl)-beta-methoxyacrylate, and ethyl beta-(4-methylphenyl)-beta-ethoxyacrylate.

* * * * *